(12) United States Patent
Mohammad et al.

(10) Patent No.: US 8,498,407 B2
(45) Date of Patent: Jul. 30, 2013

(54) SYSTEMS AND METHODS FOR DOUBLE-TALK DETECTION IN ACOUSTICALLY HARSH ENVIRONMENTS

(75) Inventors: Asif Iqbal Mohammad, San Diego, CA (US); Eddie L. T. Choy, Carlsbad, CA (US); Heejong Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 12/326,868

(22) Filed: Dec. 2, 2008

(65) Prior Publication Data

US 2010/0135483 A1      Jun. 3, 2010

(51) Int. Cl.
*H04M 9/08* (2006.01)

(52) U.S. Cl.
USPC .................... 379/406.08; 379/406.12

(58) Field of Classification Search
USPC ............... 379/406.01–406.16; 381/71.08, 381/71.11, 71.12
See application file for complete search history.

(56) References Cited

U.S. PATENT DOCUMENTS

| | | | | |
|---|---|---|---|---|
| 4,852,161 A * | 7/1989 | Hagiwara | | 379/406.05 |
| 5,136,577 A | 8/1992 | Amano et al. | | |
| 5,546,459 A | 8/1996 | Sih et al. | | |
| 5,592,548 A | 1/1997 | Sih | | |
| 5,644,596 A | 7/1997 | Sih | | |
| 5,675,644 A | 10/1997 | Sih | | |
| 5,732,134 A | 3/1998 | Sih | | |
| 5,790,632 A | 8/1998 | Antonio et al. | | |
| 5,920,834 A | 7/1999 | Sih et al. | | |
| 5,960,077 A * | 9/1999 | Ishii et al. | | 379/406.08 |
| 5,999,828 A | 12/1999 | Sih et al. | | |
| 6,226,380 B1 * | 5/2001 | Ding | | 379/413.01 |
| 6,563,803 B1 | 5/2003 | Lee | | |
| 6,606,382 B2 | 8/2003 | Gupta | | |
| 6,622,030 B1 * | 9/2003 | Romesburg et al. | | 455/570 |
| 6,738,358 B2 * | 5/2004 | Bist et al. | | 370/289 |
| 7,046,794 B2 | 5/2006 | Piket et al. | | |
| 7,099,458 B2 | 8/2006 | Piket et al. | | |
| 2002/0064291 A1* | 5/2002 | Kates et al. | | 381/318 |

(Continued)

FOREIGN PATENT DOCUMENTS

| | | |
|---|---|---|
| JP | 63234732 A | 9/1988 |
| JP | 4123606 A | 4/1992 |

(Continued)

OTHER PUBLICATIONS

Porat, B., "Second-order Equivalence of Rectangular and Exponential Windows in Least-squares Estimation of Gaussian Autoregressive Processes," IEEE Transactions on Acoustics, Speech and Signal Processing, vol. 33, No. 5, Oct. 1985, pp. 1209-1212.

(Continued)

*Primary Examiner* — Simon Sing
*Assistant Examiner* — Jeffrey Lytle
(74) *Attorney, Agent, or Firm* — Todd Marlette; Espartaco Diaz Hidalgo

(57) ABSTRACT

A communications device that is configured to detect double talk is described. An echo canceller is configured to cancel an echo from an input signal using an adaptive filter. A double-talk detector provides a double-talk statistic. The double-talk statistic is proportional to the ratio of the remaining echo energy in the cancellation error signal and the total cancellation error energy.

31 Claims, 8 Drawing Sheets

U.S. PATENT DOCUMENTS

| | | | |
|---|---|---|---|
| 2007/0091873 A1* | 4/2007 | LeBlanc et al. | 370/352 |
| 2007/0121925 A1* | 5/2007 | Cruz-Zeno et al. | 379/406.01 |
| 2007/0274535 A1* | 11/2007 | Mao | 381/94.1 |
| 2008/0152156 A1* | 6/2008 | Gao | 381/66 |
| 2008/0175375 A1* | 7/2008 | Ishiguro et al. | 379/406.08 |
| 2008/0240413 A1* | 10/2008 | Mohammad et al. | 379/406.08 |
| 2008/0240414 A1* | 10/2008 | Mohammad et al. | 379/406.08 |

FOREIGN PATENT DOCUMENTS

| | | |
|---|---|---|
| JP | 9153848 A | 6/1997 |
| WO | 0239709 A1 | 5/2002 |
| WO | WO 0239709 A1 * | 5/2002 |

OTHER PUBLICATIONS

Benesty, J., et al., "A New Class of Double-talk Detectors Based on Cross-correlation," IEEE Transactions on Speech and Audio Processing, vol. 8, No. 2, Mar. 2000, pp. 168-172.

Benesty, J., et al., "Advances in Network and Acoustic Echo Cancellation," Springer, New York, ch. 6.1 to 6.3, 2001, pp. 103-113.

Benesty, J., et al., "Advances in Network and Acoustic Echo Cancellation," Springer, New York, ch. 6.4 to 6.5, 2001, pp. 113-120.

Benesty, J., et al., "Advances in Network and Acoustic Echo Cancellation," Springer, New York, ch. 6.6 to 6.7, 2001, pp. 120-132.

Cho, J.H., et al., "An Objective Technique for Evaluating Doubletalk Detectors in Acoustic Echo Cancelers," IEEE Transactions on Speech and Audio Processing, vol. 7, No. 6, Nov. 1999, pp. 718-724.

Duttweiler, D., "A Twelve-Channel Digital Echo Canceler," IEEE Transactions on Communications, vol. 26, No. 5, May 1978, pp. 647-653.

Haykin, S., "Adaptive Filter Theory," 4th ed., Pearson Education Inc., ch. 6.3, 2002, pp. 327-331.

International Search Report and Written Opinion—PCT/US09/066195 International Search Authority—European Patent Office—Mar. 8, 2010.

International Telecommunication Union, "Series G: Transmission Systems and Media, Digital Systems and Networks, International telephone connections and circuits—Apparatus associated with long-distance telephone circuits, Digital network echo cancellers," ITU-T Recommendation G.168, Aug. 2004, pp. 1-112.

Iqbal, M.A., et al., "Normalized Double-Talk Detection Based on Microphone and AEC Error Cross-Correlation," 2007 IEEE International Conference on Multimedia and Expo, Jul. 2-5, 2007, pp. 360-363.

Martin, R., "Spectral Subtraction Based on Minimum Statistics," in Proc. Eur. Signal Processing Conf., 1994, pp. 1182-1185.

Porat, - B., "Second-order Equivalence of Rectangular and Exponential Windows in Least-squares Estimation of Gaussian Autoregressive Processes," IEEE Transactions on Acoustics, Speech and Signal Processing, vol. 33, No. 5, Oct. 1985, pp. 1209-1212.

Valin, J.-M., "On Adjusting the Learning Rate in Frequency Domain Echo Cancellation With Double-Talk," IEEE Transactions on Audio, Speech, and Language Processing, vol. 15, No. 3, Mar. 2007, pp. 1030-1034.

Ye, H., et al., "A New Double-talk Detection Algorithm Based on the Orthogonality Theorem," IEEE Transactions on Communications, vol. 39, No. 11, Nov. 1991, pp. 1542-1545.

* cited by examiner

SYSTEMS AND METHODS FOR DOUBLE-TALK DETECTION IN ACOUSTICALLY HARSH ENVIRONMENTS

TECHNICAL FIELD

The present disclosure relates generally to communication technologies. More specifically, the present disclosure relates to systems and methods for double-talk detection in acoustically harsh environments.

BACKGROUND

Communication technologies continue to advance in many areas. As these technologies advance, users have more flexibility in the ways they may communicate with one another. For telephone calls, users may engage in direct two-way calls or conference calls. In addition, headsets or speakerphones may be used to enable hands-free operation. Calls may take place using standard telephones, cellular telephones, computing devices, etc.

Sometimes during a telephone call an echo may occur, which may be distracting to those participating in the telephone call. By way of example, assume a person driving an automobile is on a speakerphone talking with another caller. For reference purposes, the driver is the near-end talker and the person at the other end of the connection is the far-end talker. The speech of the far-end talker is broadcast out of speakerphone loudspeaker. If this speech is picked up by a microphone of the driver, the far-end talker may hear an annoying echo of his or her own voice.

Echo cancellers are used to cancel the echo from the signal so that the person talking does not hear, or substantially does not hear an echo of their own voice. Echo cancellers are complex algorithms that perform digital signal processing techniques to cancel unwanted echoes. Double-talk detectors may also be used in conjunction with echo cancellers to provide better signal processing. Benefits may be realized by providing improved digital signal processing systems and methods for use in communication technologies.

DETAILED DESCRIPTION

Figure 1:
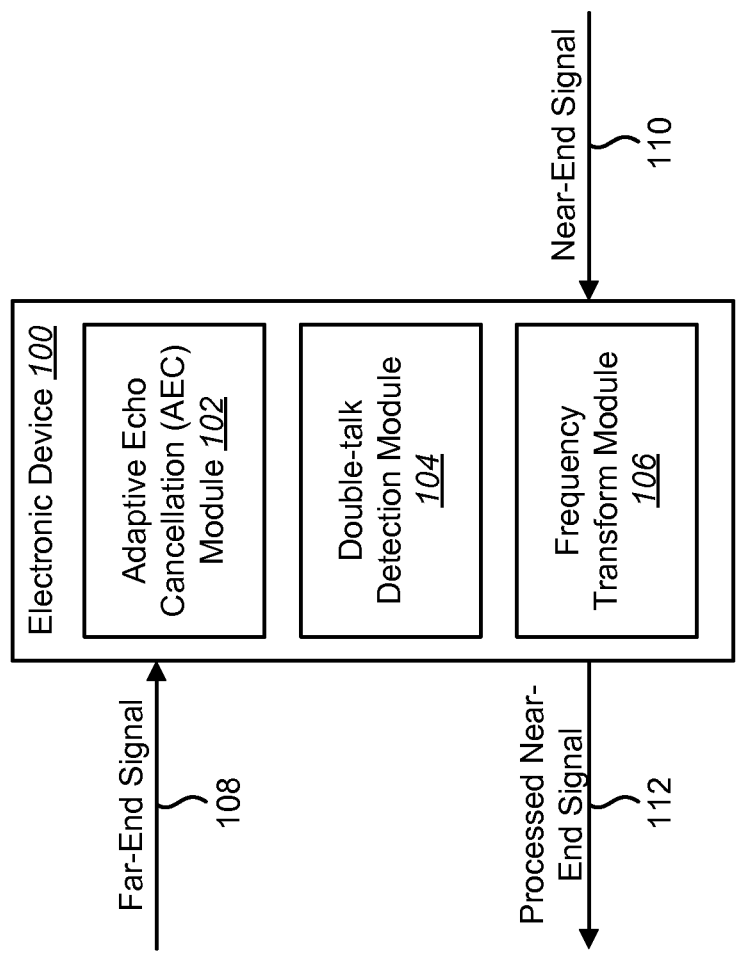
FIG. 1 is a block diagram illustrating an example of an electronic device configured to implement double-talk detection.

A communications device that is configured to detect double talk is described. An echo canceller is configured to cancel an echo from an input signal using an adaptive filter. A double-talk detector provides a double-talk statistic. The double-talk statistic is proportional to the ratio of the remaining echo energy in the cancellation error signal and the total cancellation error energy.

The device may be configured to stop the adaptive filter from adapting when the double-talk detector detects a near-end signal. The device may be further configured to resume adapting by the adaptive filter when the double-talk detector does not detect a near-end signal.

The residual echo energy may be the residual echo energy in the input signal after the input signal has been processed by the adaptive filter.

The double-talk statistic may be computed using second order statistics of available signals. The double-talk statistic may be computed based on the following equation:

$$\hat{\xi}_{New}[n] = \frac{\hat{r}_{em}[n] - \hat{\sigma}_e^2[n]}{\hat{r}_{em}[n]}$$

wherein $\hat{\xi}_{New}[n]$ is the double-talk statistic, wherein $\hat{r}_{em}[n]$ is the cross-correlation between the cancellation error and a microphone input signal, and wherein $\hat{\sigma}_e^2[n]$ is the estimated variance or the power of the cancellation error signal e[n]. A correction factor may be added to the numerator in the equation for background noise protection. The double-talk statistic may be computed in the time domain or in the frequency domain.

A non-linear post processing component may be configured to remove residual echo. The non-linear post processing component may process based on the double-talk statistic.

In one configuration, the communications device may be a wireless communications device. Additionally, the echo canceller may comprise an acoustic echo canceller.

A method for double-talk detection in a communications device is disclosed. An input signal is received at a microphone input. An echo is cancelled from the input signal using an adaptive filter. A double-talk statistic is determined. The double-talk statistic is proportional to the ratio of the remaining echo energy in the cancellation error signal and the total cancellation error energy. The double-talk statistic is used to control adaptation of the adaptive filter.

The double-talk statistic is used to control adaptation of the adaptive filter by stopping the adaptive filter from adapting when the double-talk detector detects a near-end signal. The double-talk statistic is used to control adaptation of the adaptive filter by resuming adaptation of the adaptive filter when the double-talk detector does not detect a near-end signal.

A communications device that is configured to detect double talk is disclosed. The communications device includes means for receiving an input signal and means for cancelling an echo from the input signal using an adaptive filter. The communications device also includes means for determining a double-talk statistic. The double-talk statistic is proportional to the ratio of the remaining echo energy in the cancellation error signal and the total cancellation error energy.

A computer-program product for performing double-talk detection is disclosed. The computer-program product includes a computer-readable medium having instructions thereon. The instructions include code for receiving an input signal at a microphone input and code for cancelling an echo from the input signal using an adaptive filter. The instructions also include code for determining a double-talk statistic. The double-talk statistic is proportional to the ratio of the remaining echo energy in the cancellation error signal and the total cancellation error energy. The instructions include code for using the double-talk statistic to control adaptation of the adaptive filter.

Herein a new double-talk detection statistic is described with improved performance in acoustically harsh scenarios where near-end speech level is often much below the echo level. The proposed statistic not only meets the needs of an optimal double-talk detector, but performs well relative to other solutions while maintaining computational efficiency. A double-talk detector is primarily used to inhibit acoustic echo canceller's (AEC's) filter adaptation during periods of near-end speech. Further, to remove the residual echo leaving the linear adaptive filter (which is often noticeable) in an AEC some form of non-linear post processing is done. The non-linear post processor typically operates based on the double-talk decision, thus to achieve full duplex communication in acoustically harsh scenarios, such as the speakerphone mode in mobile devices where near-end is typically much below the echo level, the proposed statistic can be extremely useful.

In most of the teleconferencing and mobile devices, microphone(s) are located in close proximity of the loud speakers and hence strong far-end echoes are picked up by the microphones. An AEC is typically used in such cases to enable echo-free full duplex communication between the near-end speaker and the far-end speaker located remotely in a different room. The signal from the far-end speaker is played through the loud speaker(s) and is also picked up by the closely located microphone(s). So the far-end speaker may listen to its own delayed speech called echo, if the delay between the speech and its echo is more than a few tens of milliseconds. The echo in this case is distinctly noticeable, annoying and hence needs to be cancelled. An AEC is used to remove this undesirable echo. In an AEC a linear adaptive filter ($\hat{h}$) is used to model the true room response (h). The linear adaptive filter generates a replica of the echo $\hat{y}$ which is subtracted from the echo-corrupted microphone signal m to get an echo free signal e.

A normalized least mean square (NLMS) based adaptive algorithm may be used to model the room response, because of its robustness and simplicity. The NLMS based adaptive filter coefficients converge to the true room response by minimizing the mean square error. This might look like a straight-forward system identification task for the adaptive filter. However, in almost all of the conversations there are the so-called double-talk (simultaneous far-end and near-end signal) situations that make the identification task much more challenging than what it might appear at first glance. The near-end signal acts as a strong uncorrelated noise to the adaptive algorithm. The disturbing near-end signal, if undetected, may cause the adaptive filter to diverge, allowing annoying echo to go through to the far-end. One approach to alleviate/solve this problem is to slow down or completely freeze adaptation during periods of near-end speech. A double-talk detector is used to sense when the microphone signal is corrupted by the near-end signal. The difficult detection case is when both the near-end and far-end are active-the double-talk detection problem. In acoustically harsh scenarios, such as the speaker phone mode in mobile devices, the near-end signal is often much below the far-end echo and hence detection becomes more problematic. This brings up the requirement of an efficient double-talk detector. Further the residual echo leaving the linear adaptive filter is often audible and hence needs to be removed. Some kind of non linear post processing may be used to get rid of the echo completely. However, the near-end speech needs to be preserved. Hence, the system should differentiate between the near-end signal and residual echo before clipping or removing the signal completely. A decision from the double-talk detector may be used; hence a missed near-end speech by a double-talk detector will be lost. Thus, to achieve full duplex communication in such acoustically harsh scenarios, which unfortunately are so common, an efficient double-talk detector is often needed.

In a double-talk detector, a decision statistic is formed from the available signals x, e, m and the adaptive filter coefficients $\hat{h}$. An optimum decision statistic $\xi$ for double-talk detection should behave as follows:

(a) If no near-end speech (v=0), then $\xi$>T where T is a pre-selected threshold.

(b) During near-end speech (v≠0), $\xi$<T.

(c) $\xi$ should be insensitive to echo-path variations.

Further, the pre-selected threshold T should be a constant, independent of the data. It is also desirable that the decisions are made without introducing any undue delays, since the delayed decisions adversely affect the performance of an AEC. Herein is provided a new double-talk detection scheme that meets the above stated requirements of an optimal double-talk detector. Further, the proposed statistic has superior performance when the near-end speech level is far below the echo level.

The subject matter described herein facilitates controlling the performance of an echo canceller (EC), for instance an acoustic echo canceller (AEC) or a line echo canceller. By way of example, the subject matter includes a double-talk detector based on the second order statistics of the available signals such as the excitation signal, corrupted microphone/line signal, residual echo leaving the linear adaptive filter and the AEC filter coefficients.

FIG. 1 is a block diagram illustrating an example of an electronic device 100 configured to implement double-talk detection. The electronic device 100 may be any device capable of full duplex communication. This may include, without limitation, speaker phones or mobile phones. The electronic device 100 may include an adaptive echo cancellation (AEC) module 102, a double-talk detection module 104, and a frequency transform module 106. Further, the electronic device 100 may receive a far-end signal 108, a near-end signal 110, and may output a processed near-end signal 112. The AEC module 102 may be responsible for removing undesirable echo from the near-end signal 110. The double-talk detection module 104 may be responsible for determining when a near-end signal is present and accordingly control the AEC module. The frequency transform module 106 may be responsible for transforming signals from time domain into frequency domain and then back again to the time domain. These functions will be discussed in further detail below in conjunction with subsequent figures.

Figure 2:
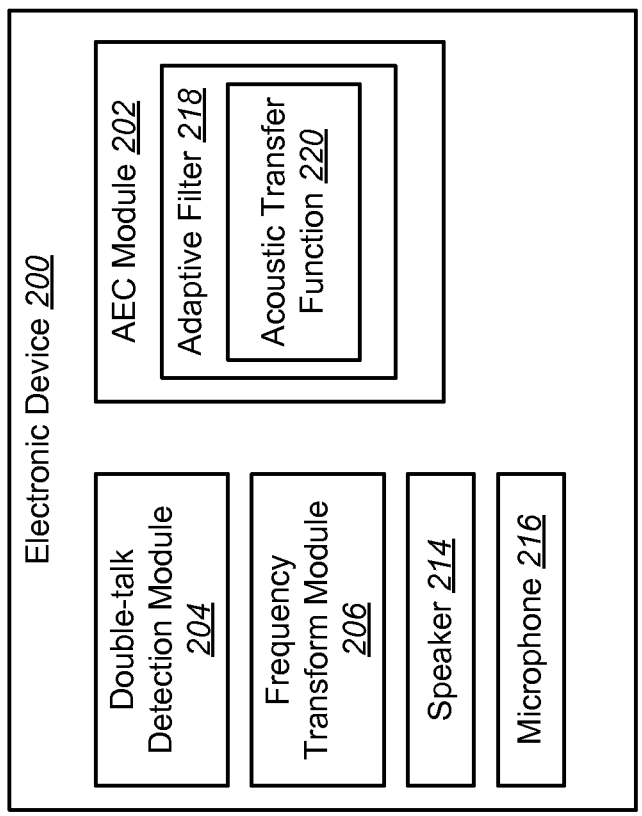
FIG. 2 is a block diagram illustrating another example of an electronic device configured to implement double-talk detection.

FIG. 2 is a block diagram illustrating another example of an electronic device 200 configured to implement double-talk detection. As before, the electronic device may include a double-talk detection module 204, a frequency transform module 206 and an AEC module 202. Further, the AEC module 202 may include a linear adaptive filter 218. This filter 218 may produce an acoustic transfer function $\hat{h}[n]$ 220. This function $\hat{h}[n]$ may include linear filter coefficients modeling an acoustic path response, h[n], of the physical surroundings of the electronic device (not shown). The function $\hat{h}[n]$ may be used to model the echo produced from a speaker 214 due to acoustic conditions surrounding the electronic device 200. Once the acoustic environment has been modeled using $\hat{h}[n]$, the AEC module 202 may remove the echo from a near-end signal picked up by a microphone 216 to produce an echo free signal. There may be one or more microphones 216 and one or more speakers 214.

Figure 3:
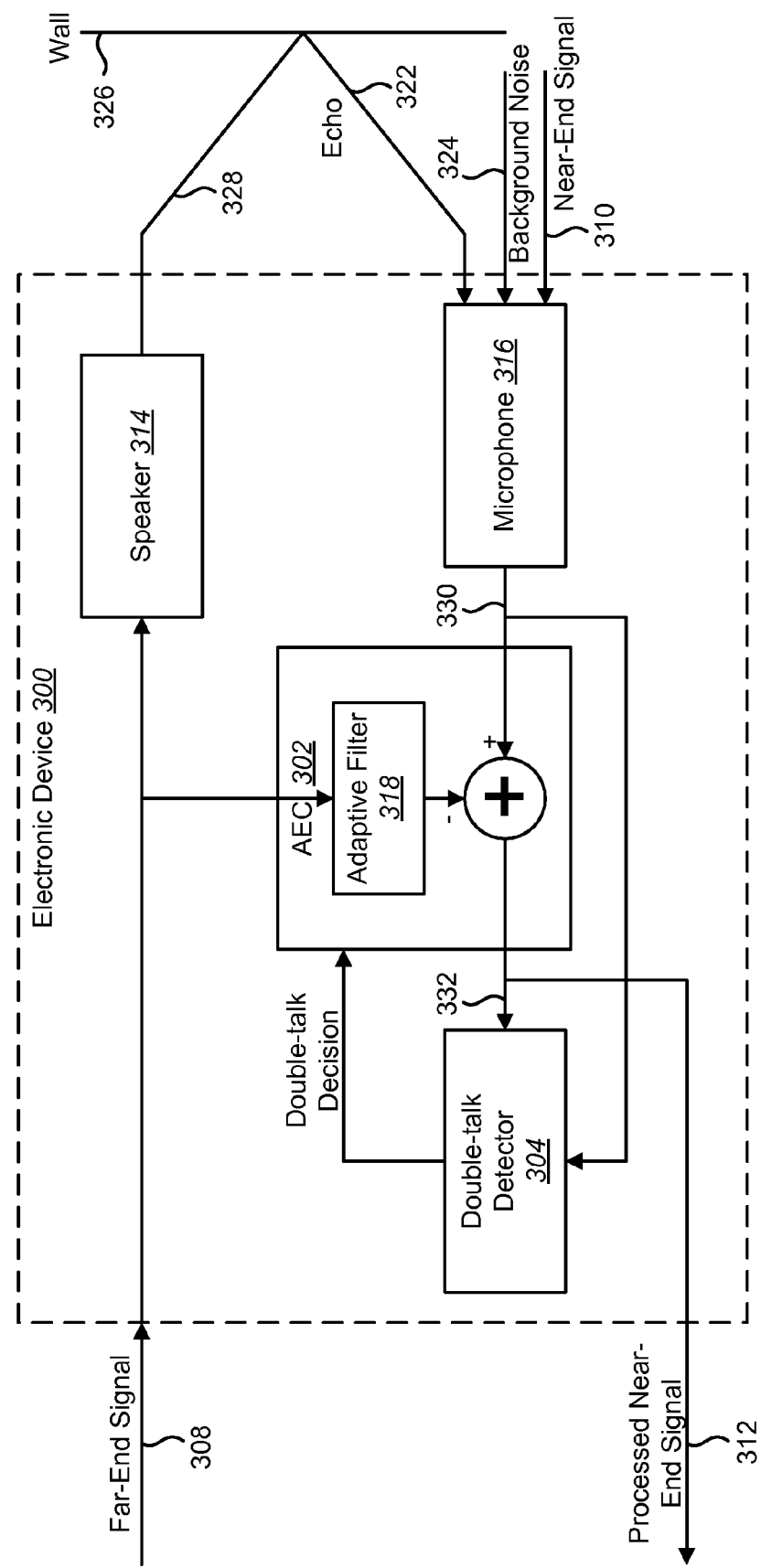
FIG. 3 is a block diagram illustrating another example of an electronic device configured to implement double-talk detection in the time domain.

FIG. 3 is a block diagram illustrating another example of an electronic device 300 configured to implement double-talk detection in the time domain. The electronic device 300 may first receive a far-end signal 308. As used herein, the term "far end" refers to something not in relative proximity to the electronic device 300. Conversely, the term "near end" refers to something in relative proximity to the electronic device 300. In other words, the speech of a user of the electronic device 300 may generate a near-end signal 310, while the speech of another person communicating remotely (far-end user) with the electronic device 300 may generate a far-end signal 308. Upon receiving the far-end signal, the electronic device 300 may play the far-end signal 308 on a speaker 314. In many electronic devices, the microphone 316 may be located in close proximity to the speaker 314. Thus, the microphone 316 may receive strong far-end echo 322. If left unchecked, the far-end user may listen to its own delayed signal, or echo. This echo may be filtered through the acoustic path response, h[n], for instance 328 is one of the infinitely many acoustic paths signal can take, of the physical surroundings of the electronic device 300. For example, a small room constructed of acoustically reflective materials will propagate a stronger echo than a room constructed of acoustically dampening materials. The echo y[n] may be represented by equation (1), below.

$$y[n] = h^T[n]x[n] \quad (1)$$

The term h[n] is the room response, and x[n] is the far-end signal 308. The terms h[n] and x[n] are calculated as shown in equations (2) and (3), below.

$$h[n] = [h_0(n) h_1(n) \ldots h_{l-1}(n)]^T \quad (2)$$

$$x[n] = [x(n) x(n-1) \ldots x(n-l+1)]^T \quad (3)$$

The parameter l is the length of the adaptive filter. This echo signal y[n] is acoustically added to the near-end speech signal v[n] to get the microphone signal m[n] shown in equation (4).

$$m[n] = y[n] + v[n] + w[n] \quad (4)$$

The term w[n] is the additive background noise. The cancellation error signal at time n is defined as e[n] in equation (5).

$$e[n] = m[n] - \hat{h}^T[n-1]x[n] \quad (5)$$

The cancellation error signal e[n] is used to adapt the l taps of the adaptive filter $\hat{h}[n]$ to generate an estimate of the echo shown in equation (6).

$$\hat{y}[n] = \hat{h}^T[n-1]x[n] \quad (6)$$

Additionally, the microphone 316 may also receive background noise 324 and a near-end signal 310. Alternatively, the microphone 316 may not receive background noise 324 or a near-end signal 310.

Therefore, the electronic device 300 may use an AEC module 302 to rid the microphone 316 input signal of the unwanted echo 322. The use of AEC modules to subtract echo 322 from a signal in an electronic device is known. One method of subtracting echo 322 from a signal may be by using a linear adaptive filter 318 as part of an AEC module 302. As is suggested by the name, a linear adaptive filter 318 may only remove linear echo. In other words, the acoustic path h[n] between the speaker 314 and the microphone 316 must have a linear component in order for a linear adaptive filter 318 to remove the echo. However, many echo signals include both linear and non-linear echo. Non-linear processing will be discussed in conjunction with FIG. 7. For the purposes of FIG. 3, however, assume the echo, y[n], 322 is linear.

Upon receiving the microphone signal, m[n], 330 the filter 318 may generate a replica of the echo, ŷ, which may then be subtracted from the echo-corrupted signal m[n]. A normalized least mean square (NLMS) based adaptive algorithm may be used in the adaptive filter 318 to model the room response, because of its robustness and simplicity. The NLMS based adaptive filter coefficients, $\hat{h}[n]$, converge to the true room response 328, h[n], by indirectly minimizing the mean square error between $\hat{h}[n]$ and h[n].

This method of removing echo 322, however, may have a problem when the near-end signal, v[n], 310 is active. In other words, the filter 318 may perform well when there is no signal 310 from a near-end user, like speech. However, because the filter may be always adapting, when a near-end signal, v[n], 310 is present, it may act as a strong uncorrelated noise to the adaptive filter 318 algorithm. Thus, the presence of a near-end signal, v[n], 310 may cause the filter 318 to diverge and allow echo, y[n], 322 to go through to the far-end user. This problem is referred to as double-talk, when both a far-end user and a near-end user are providing signals to a full duplex communication system.

Upon receiving a microphone input signal 330, the electronic device may also determine whether the signal 330 includes a near-end signal 310. This may be done in the double-talk detector 304. One such method may involve calculating a statistic, represented herein by ξ, to determine when the microphone signal, m[n], 330 includes an active near-end signal v[n] 310. One such method of calculating this statistic is given by the following equation, noting that the statistic varies with time, n, which has been dropped for simplicity's sake. The normalized cross-correlation based double-talk detection statistic shown in equation (7) is the ratio of the echo power to the microphone power.

$$\xi_{Old} = \frac{\sigma_y^2}{\sigma_m^2} = \frac{h^T R_{xx} h}{h^T R_{xx} h + \sigma_v^2 + \sigma_w^2} \quad (7)$$

In equation (7) $\sigma_y^2$ is the power of the echo, y[n], 322 and $\sigma_m^2$ is the power of the microphone input signal, m[n], 330. Thus, in the absence of any near-end signals ($\sigma_v^2 = \sigma_w^2 = 0$), the statistic converges to unity, $\xi_{Old} \approx 1$. On the other hand, when $\xi_{Old} < T$, where T is a pre-selected threshold chosen close to 1, double-talk is detected. When double-talk is detected, the filter 318 may then stop or slow down adapting to avoid filtering the near-end signal 310 and unintentionally allowing the echo 322 through to the far-end user.

This statistic, however, may not perform well in acoustically harsh environments. In other words, when the far-end echo 322 may be significantly stronger than the near-end signal 310, it may be difficult to accurately detect double-talk. For example, if $\sigma_v^2$ is much smaller than $\sigma_y^2$, $\xi_{Old}$ will not approach 0, but rather remain close to 1, which may then indicate to adaptive filter 318 to continue the filter coefficients update. This may produce poor echo cancellation performance in acoustically harsh environments. To address this, a new statistic, $\xi_{New}$ may be used by the double-talk detector 304 to determine whether the microphone input signal 330 includes a near-end signal 310.

This new statistic may be modeled approximately after the ratio of the residual echo energy leaving the linear adaptive filter 318 to the energy of the cancellation error in the following equation:

$$\xi_{New} = \frac{(h-\hat{h})^T R_{xx} \hat{h}}{(h-\hat{h})^T R_{xx} h + \sigma_v^2 + \sigma_w^2} \quad (8)$$

This new statistic exhibits the same properties in acoustically non-harsh environments as the statistic from equation (7). In other words, in the absence of any near-end signals ($\sigma_v^2=\sigma_w^2=0$) the statistic converges to unity, which indicates no double-talk. However, in acoustically harsh environments, $\xi_{New}$ may exhibit improved performance over $\xi_{Old}$. In other words, in the presence of near-end signals ($\sigma_v^2 \neq 0$ or/and $\sigma_w^2 \neq 0$), $\xi_{New}$ goes below unity, thus detecting double-talk, for a broader range of $\sigma_v^2$ and $\sigma_w^2$ than $\xi_{Old}$.

The new statistic may be computed using the second order statistics of the available signals as shown in equation (9).

$$\xi_{New}[n] = \frac{r_{em}[n] - \sigma_e^2[n]}{r_{em}[n]} \quad (9)$$

In equation (9) $r_{em}[n]$ is the cross-correlation between the residual echo signal, e[n], 332 and the microphone input signal, m[n], 330. The term $\sigma_e^2[n]$ is the variance or the power of the cancellation error signal e[n]. However, since the true values of $r_{em}[n]$ and $\sigma_e^2[n]$ may not be available, the final decision statistic may be given by equation (10).

$$\hat{\xi}_{New}[n] = \frac{\hat{r}_{em}[n] - \hat{\sigma}_e^2[n]}{\hat{r}_{em}[n]} \quad (10)$$

The estimates in equation (10) are denoted by a hat (^). The estimates may be found using the exponential recursive weighting algorithms shown in equations (11) and (12).

$$\hat{r}_{em}[n] = \lambda \hat{r}_{em}[n-1] + (1-\lambda) m[n] e[n] \quad (11)$$

$$\hat{\sigma}_e^2[n] = \lambda \hat{\sigma}_e^2[n-1] + (1-\lambda) e^2[n] \quad (12)$$

In equations (11) and (12), e[n] is the captured cancellation error sample at time n, m[n] is the captured microphone signal sample at time n, and λ is the exponential weighting factor. The forgetting factor λ determines the time constant and the estimation accuracy of the recursive estimate. In one configuration the system may use $\lambda \in [0.9, 1)$. In general, the smaller the λ, the better the time varying signal tracking capability and worse the estimation accuracy. To provide more protection from the background noise, the double-talk detector may also add a small correction as calculated in equation (13).

$$\hat{\xi}_{New}[n] = \frac{\hat{r}_{em}[n] - \hat{\sigma}_e^2[n] + \alpha \hat{\sigma}_x^2[n]}{\hat{r}_{em}[n]} \quad (13)$$

In equation (13), α is a small positive quantity ($\alpha \in [0, 0.1]$) and $\hat{\sigma}_x^2[n]$ is the estimated variance or the power of the far-end excitation signal.

Once the double-talk detector 304 determines whether the microphone input signal 330 includes a near-end signal 310, the double-talk detector 304 may send a signal to the AEC module 302 indicating its determination. If the signal 330 includes a near-end signal, the AEC module 302 may reduce adapting speed or turn off the adaptive filter 318. If the signal 330 does not include a near-end signal, the AEC module 302 may not change the filter's 318 update status. The residual echo signal, e[n], 332 may also be sent to the far-end user.

Figure 4:
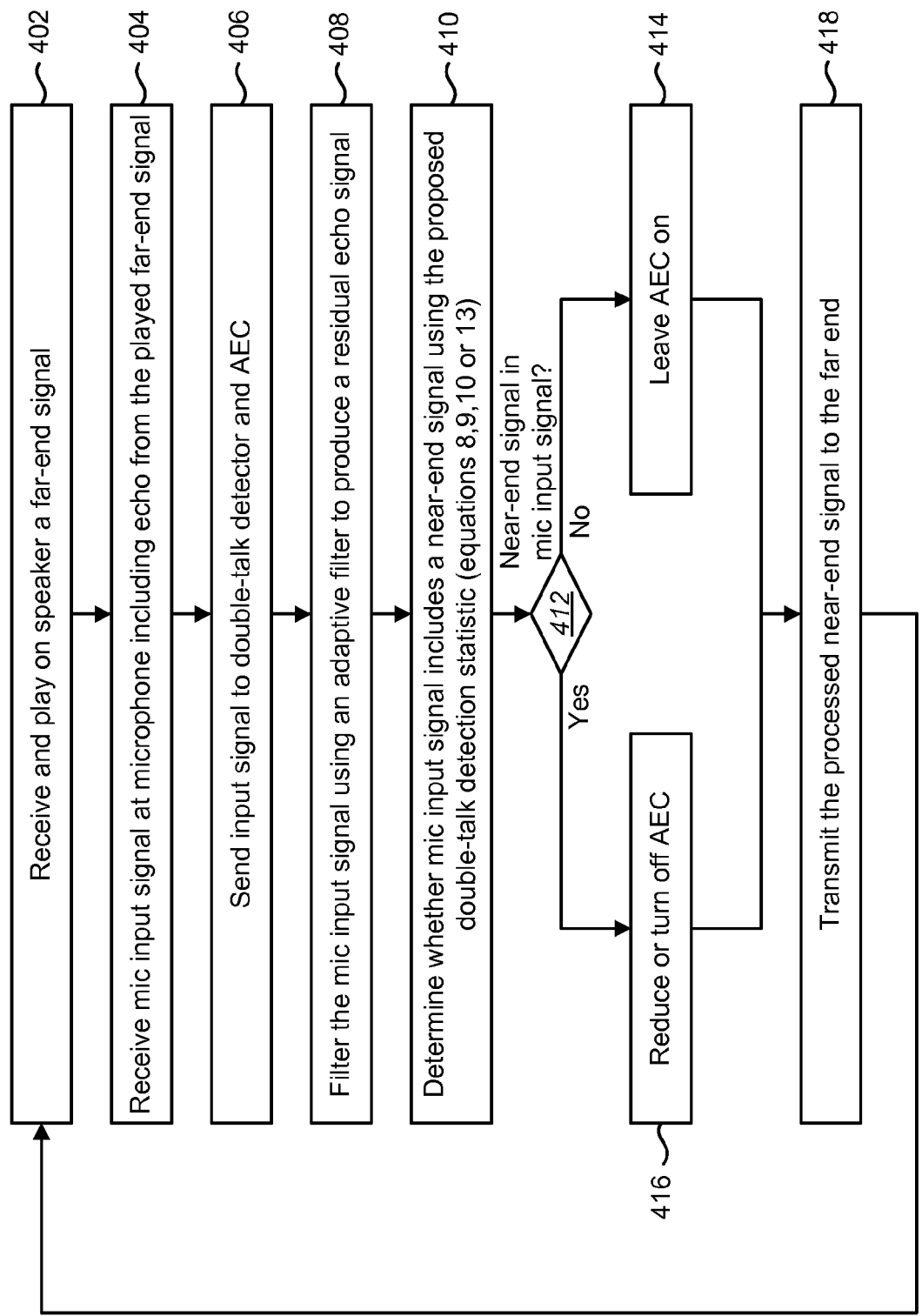
FIG. 4 is a flow diagram illustrating one configuration of a method for using the double-talk detector.

FIG. 4 is a flow diagram illustrating one configuration of a method for using the double-talk detector. A far-end signal may be received and played 402 on a speaker 314. A mic input signal may be received 404 at the microphone 316 that includes an echo from the played far-end signal. The input signal may be sent 406 or provided 406 to the double-talk detector 304 and the AEC 302. The mic input signal may be filtered 408 using an adaptive filter 318 to produce a residual echo signal.

It may then be determined 410 whether the mic input signal includes a near-end signal using the proposed double-talk statistic (equations 8, 9, 10 or 13). If 412 doubletalk is detected, then the AEC 302 may be reduced 416 or turned off 416 so that it is no longer adapting or so that adapting speed is substantially reduced. If 412 double talk is not detected, then the AEC 302 may not be altered or may otherwise be left operating 414 substantially the same. The processed near-end signal 312 may be transmitted 418 to the far end. The method may continue operation until the call has ended.

Figure 5:
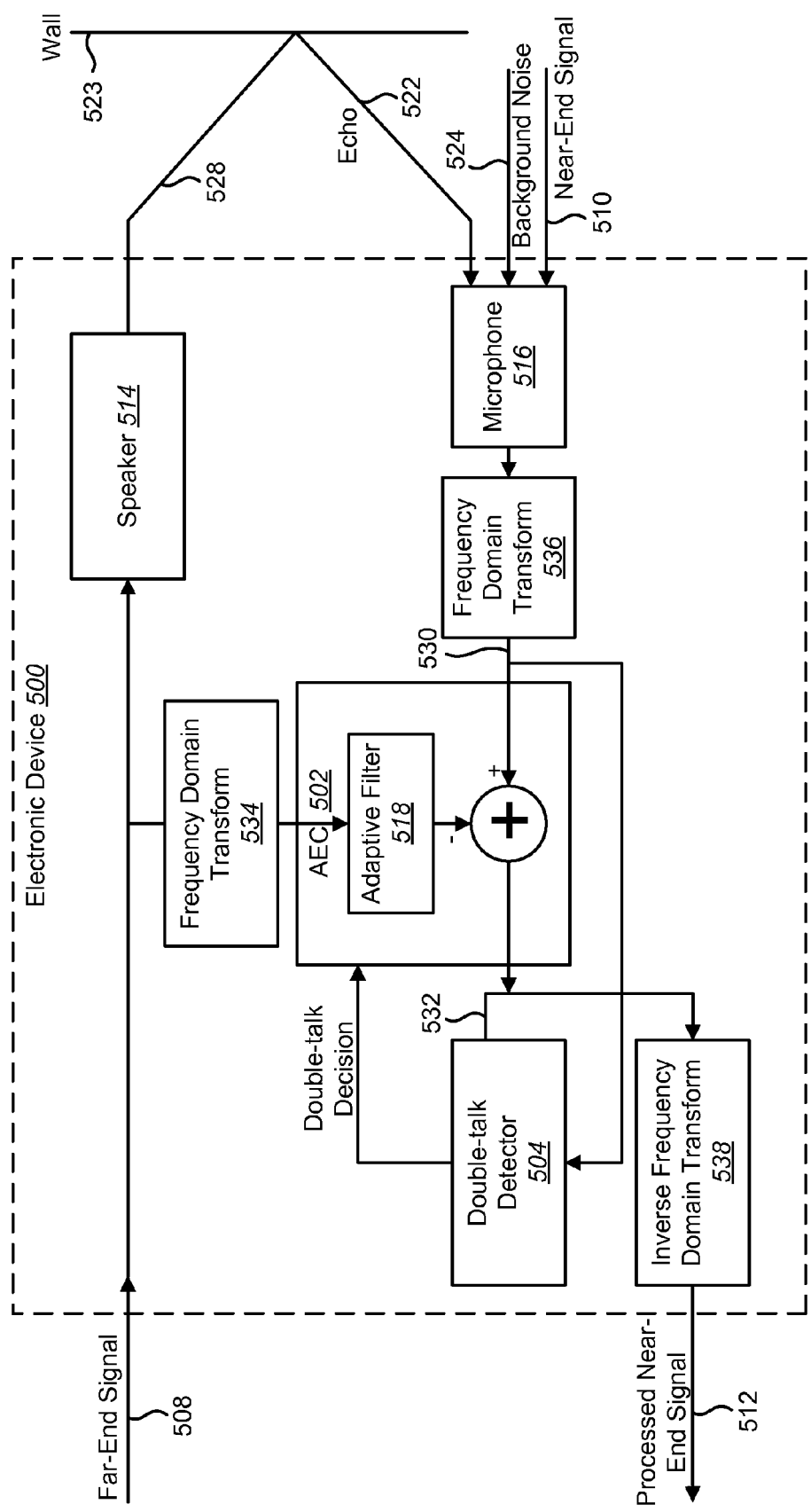
FIG. 5 is a block diagram illustrating another example of an electronic device configured to implement double-talk detection in the frequency domain.

FIG. 5 is a block diagram illustrating another example of an electronic device 300, wherein the device 300 has been configured to implement double-talk detection in the frequency domain. The various elements of FIG. 5 may be similar to those illustrated with respect to FIG. 3 except for the frequency domain aspect of FIG. 5. Because of the computational advantages and improved performance, the AEC is often implemented in the frequency domain as shown in FIG. 5. The proposed double-talk detection scheme may also be implemented in the frequency domain by using a frequency domain based decision statistic for each subband. For instance, see equation (14).

$$\hat{\xi}_{New}(k, t) = \frac{\hat{r}_{em}(k, t) - \hat{\sigma}_e^2(k, t) + \alpha \hat{\sigma}_x^2(k, t)}{\hat{r}_{em}(k, t)} \quad (14)$$

In equation (14), $\hat{r}_{em}(k,t)$ is an estimate of the cross-correlation coefficient between the corrupted signal and the error signal for the kth frequency subband and tth frame, $\hat{\sigma}_e^2(k, t)$ is the estimate of the variance of the cancellation error signal for the kth frequency subband and tth frame and $\hat{\sigma}_x^2(k,t)$ is the estimate of the variance of the excitation signal for the kth frequency subband and tth frame. In one example, the cross-correlation coefficient between the corrupted signal and the error signal, the variance of the error signal and the variance of the excited signal can be updated as shown in equations (15), (16) and (17).

$$\hat{r}_{em}(k,t) = \lambda \hat{r}_{em}(k,t-1) + (1-\lambda) m^H(k,t) e(k,t) | \quad (15)$$

$$\hat{\sigma}_m^2(k,t) = \lambda \hat{\sigma}_m^2(k,t-1) + (1-\lambda) m^H(k,t) m(k,t) \quad (16)$$

$$\hat{\sigma}_x^2(k,t) = \lambda \hat{\sigma}_x^2(k,t-1) + (1-\lambda) x^H(k,t) x(k,t) \quad (17)$$

In equations (15), (16) and (17), e(k,t) is the kth subband of the frequency domain transform of the tth frame of the echo cancellation error, m(k,t) is the kth subband of the frequency domain transform of the tth frame of the corrupted signal vector, x(k,t) is the kth subband of the frequency domain transform of the tth frame of the excited signal vector and H is the Hermitian. Thus, the double-talk detector 504 may be implemented at a frequency bin level as defined by equations (14)-(17).

Referring again to FIG. 5, the electronic device 500 may first receive a far-end signal 508. The speech of a user of the electronic device 500 may generate a near-end end signal 510, while the speech of another person communicating remotely (far-end user) with the electronic device 500 may generate a far-end signal 508. Upon receiving the far-end signal, the electronic device 500 may play the far-end signal 508 on a speaker 514. In many electronic devices, the microphone 516 may be located in close proximity to the speaker 514. Thus, the microphone 516 may receive strong far-end echo 522. If left unchecked, the far-end user may listen to its own delayed signal, or echo. This echo may be filtered through the acoustic path response, h[n] 528, of the physical surroundings of the electronic device 500. For example, a small room constructed of acoustically reflective materials will propagate a stronger echo than a room constructed of acoustically dampening materials.

Additionally, the microphone 516 may also receive background noise 524 and the near-end signal 510. Alternatively, the microphone 516 may not receive background noise 524 or a near-end signal 510.

Therefore, the electronic device 500 may use an AEC module 502 to rid the microphone 516 input signal of the unwanted echo 522. Upon receiving the microphone signal, m[n], the device may convert the signal from the time domain to the frequency domain using the frequency domain transform 536. The frequency domain microphone signal 530 may have the echo cancelled from it 530 by the AEC 502 and the adaptive filter 518. In the frequency domain, the double-talk detector 504 may detect double talk according to the equations shown above. Before the signal is sent to the far end, after processing, it is transformed back to the time domain using an inverse frequency domain transform 538. Finally, the processed signal 512 is transmitted to the far end.

Figure 6:
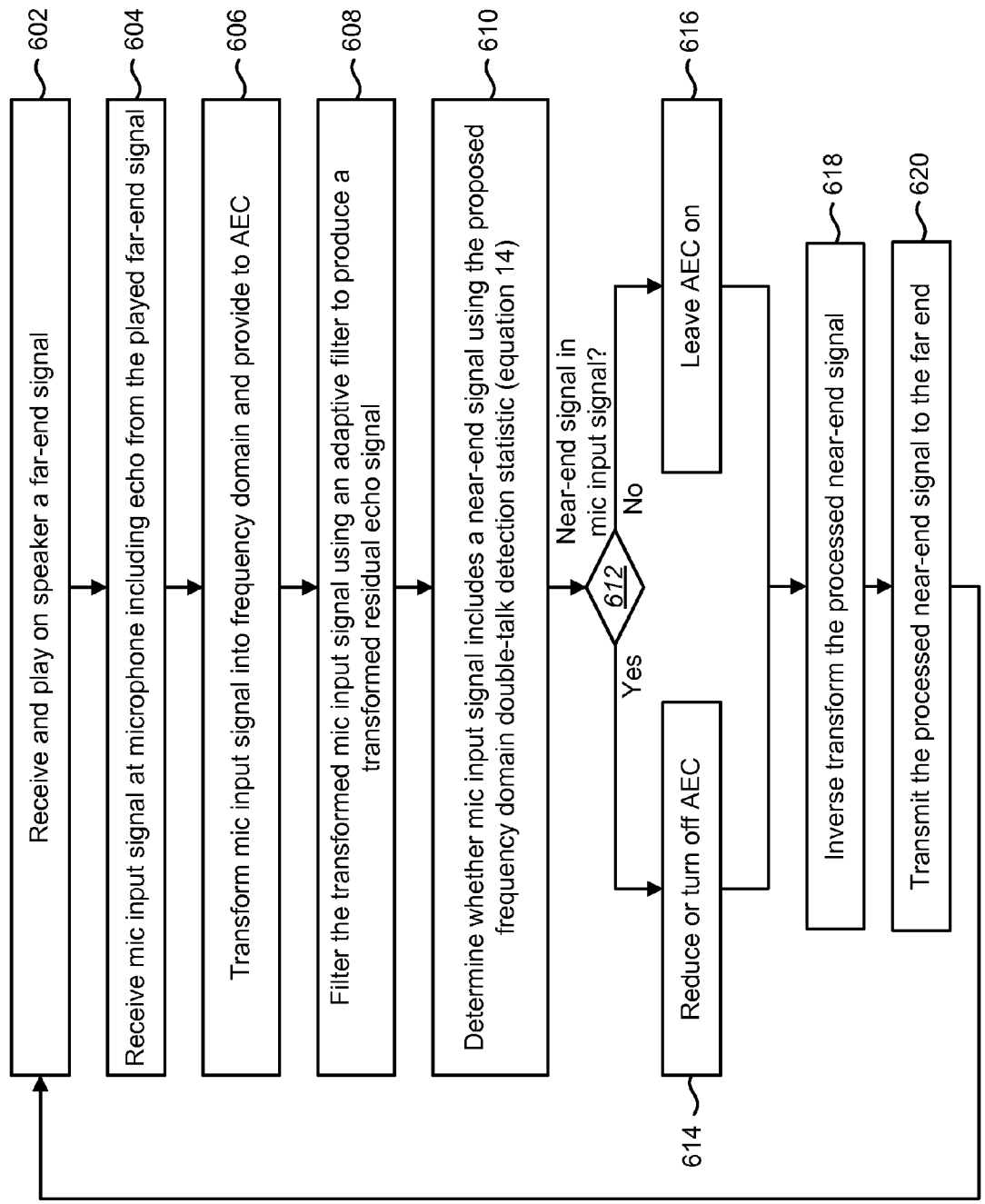
FIG. 6 is a flow diagram illustrating one configuration of a method for using the double-talk detector in the frequency domain.

FIG. 6 is a flow diagram illustrating one configuration of a method for using the double-talk detector in the frequency domain. A far-end signal may be received and played 602 on a speaker 514. A mic input signal may be received 604 at the microphone 516 that includes an echo from the played far-end signal. The mic input signal may then be transformed 606 into the frequency domain and provided to the AEC 502. The mic input signal may be filtered 608 using an adaptive filter 518 to produce a transformed residual echo signal.

It may then be determined 610 whether the mic input signal includes a near-end signal using the proposed frequency domain double-talk detection statistic (equation 14). If 612 double talk is detected, then the AEC 502 may be reduced 614 or turned off 614 so that it is no longer adapting or so that adapting is substantially reduced. If 612 double talk is not detected, then the AEC 502 may not be altered or may otherwise be left operating 616 substantially the same. The processed near-end signal may then be transformed 618 back to the time domain and transmitted 620 to the far end. The method may continue operation until the call has ended.

Figure 7:
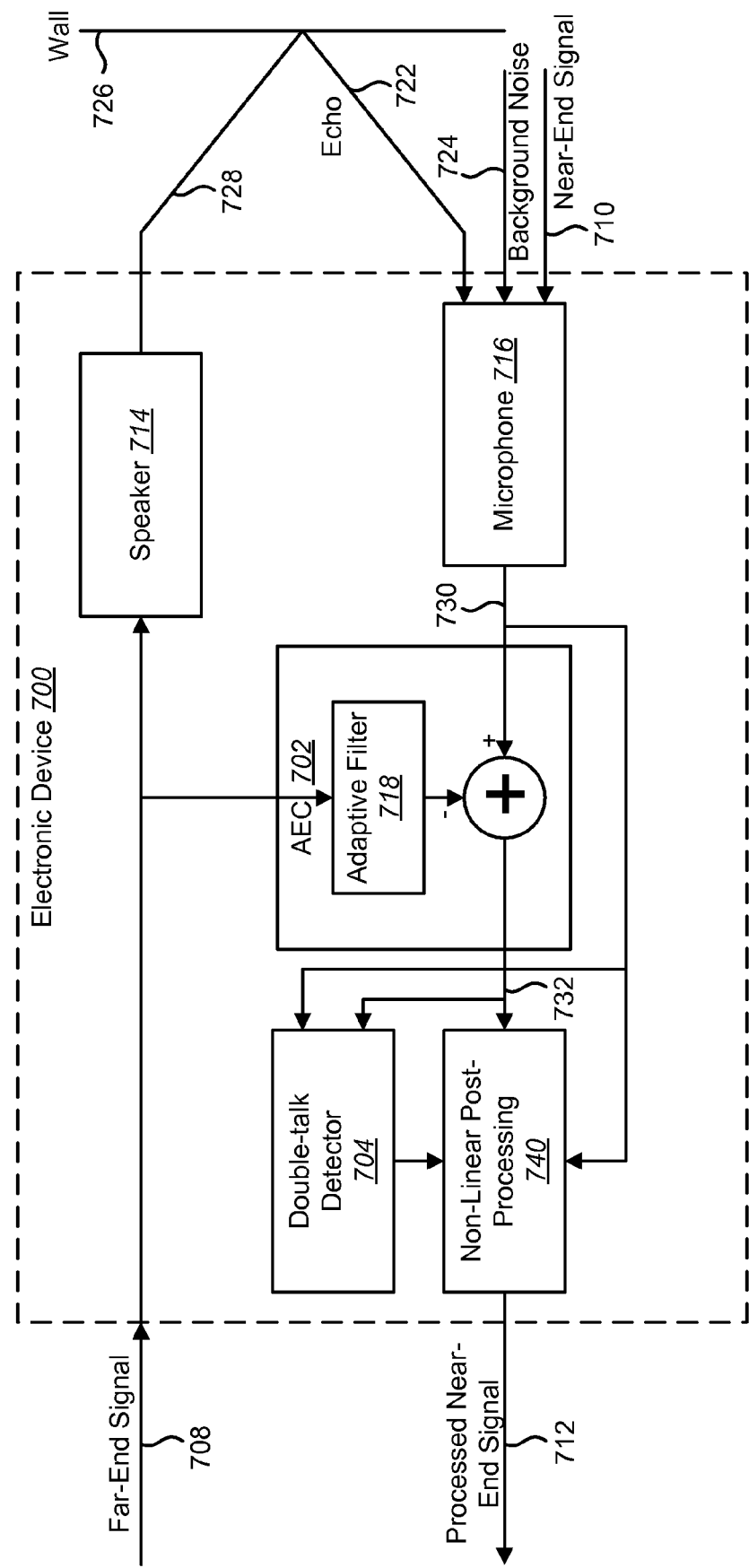
FIG. 7 is a block diagram illustrating another example of an electronic device configured to implement double-talk detection with non-linear post processing.

FIG. 7 is a block diagram illustrating another example of an electronic device 700 configured to implement double-talk detection with non-linear post processing. The various elements of FIG. 7 may be similar to those illustrated with respect to FIGS. 3 and 5. The configuration of FIG. 7 is meant to illustrate the use of non-linear post processing 740 and its relationship with the double-talk detector 704.

The electronic device 700 may first receive a far-end signal 708. The speech of a user of the electronic device 700 may generate a near-end signal 710, while the speech of another person communicating remotely (far-end user) with the electronic device 700 may generate a far-end signal 708. Upon receiving the far-end signal, the electronic device 700 may play the far-end signal 708 on a speaker 714. In many electronic devices, the microphone 716 may be located in close proximity to the speaker 714. Thus, the microphone 716 may receive strong far-end echo 722. If left unchecked, the far-end user may listen to its own delayed signal, or echo. This echo may be filtered through the acoustic path response, h[n] 728, of the physical surroundings of the electronic device 700. Additionally, the microphone 716 may also receive background noise 724 and the near-end signal 710. Alternatively, the microphone 716 may not receive background noise 724 or a near-end signal 710.

The electronic device 700 may use an AEC module 702 to rid the microphone 716 input signal of the unwanted echo 722. The microphone signal 730 may have the echo cancelled from it 730 by the AEC 702 and the adaptive filter 718. The double-talk detector 704 may detect double talk according to the equations shown above. After processing, the processed signal 712 is transmitted to the far end.

As shown, a non-linear post-processing component 740 may perform certain types of processing on the signal 732 provided by the AEC 702. For example, the non-linear post-processing block may remove the residual echo from the signal 732 leaving the linear adaptive filter. The non-linear post processor 740 may operate based on the double-talk decision from the double-talk detector 704. Hence, the double-talk decision helps differentiate between the near-end signal and residual echo before the non-linear post processor 740 clips or removes the signal completely.

Figure 8:
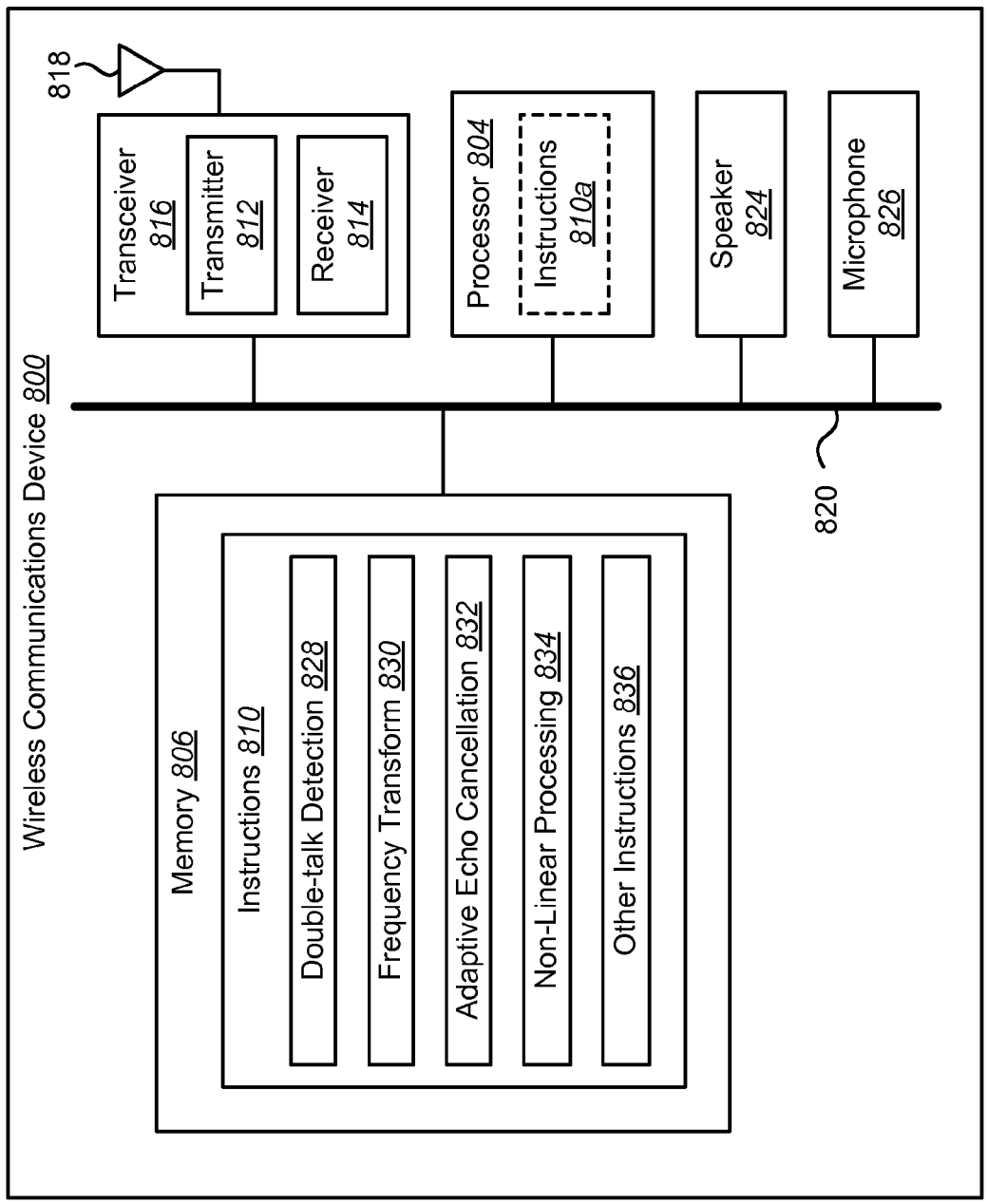
FIG. 8 is a block diagram of a wireless electronic device that is configured to implement double-talk detection as described herein.

Reference is now made to FIG. 8. FIG. 8 illustrates certain components that may be included within a wireless communications device 800 that may be configured to implement the systems and methods for double-talk detection as described herein. The systems and methods herein may be implemented in other communications devices including wired devices.

The device 800 includes a processor 804. The processor 804 may be a general purpose single- or multi-chip microprocessor (e.g., an ARM), a special purpose microprocessor (e.g., a digital signal processor (DSP)), a microcontroller, a programmable gate array, etc. The processor 804 may be referred to as a central processing unit (CPU). Although just a single processor 804 is shown in the communications device 800 of FIG. 8, in an alternative configuration, a combination of processors (e.g., an ARM and DSP) could be used.

The communications device 800 also includes memory 806. The memory 806 may be any electronic component capable of storing electronic information. The memory 806 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data and instructions 810 may be stored in the memory 806. The instructions 810 may be executable by the processor 804 to implement various functions. Executing the instructions 810 may involve the use of the data that is stored in the memory 806. Certain instructions 810a may be loaded into the processor 804 for execution.

Some examples of the instructions 810 in the memory 806 include: instructions 828 for implementing the double-talk detection systems and methods as described herein, instructions 830 for frequency-domain/time-domain transforms, instructions 832 for adaptive echo cancellation, and instructions 834 for non-linear post processing. Other instructions 836 that are relevant to implementing the techniques described herein may also be included in the memory 806.

The communications device 800 may also include a transmitter 812 and a receiver 814 to allow transmission and reception of signals between the communications device 800 and a remote location. The transmitter 812 and receiver 814 may be collectively referred to as a transceiver 816. An antenna 818 may be electrically coupled to the transceiver 816. The communications device 800 may also include (not shown) multiple transmitters, multiple receivers, multiple transceivers and/or multiple antennas. The communications device 800 may also include one or more speakers 824 and one or more microphones 826.

The various components of the communications device 800 may be coupled together by one or more buses, which may include a power bus, a control signal bus, a status signal bus, a data bus, etc. For the sake of clarity, the various buses are illustrated in FIG. 8 as a bus system 820.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, one or more computers, discrete gate or transistor logic, discrete hardware components, and so forth, including combinations thereof.

For a firmware and/or software implementation, the techniques may be implemented with modules (e.g., procedures, functions, programs, routines, sub-routines, etc.) that perform the functions described herein. The firmware and/or software instructions may be stored in a memory and executed by a processor. The memory may be implemented within the processor or external to the processor.

As used herein, the term "processor" should be interpreted broadly to encompass a general purpose processor, a microprocessor, a digital signal processor (DSP), a controller, a microcontroller, a state machine, and so forth. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. Memory is said to be in electronic communication with a processor if the processor can read information from and/or write information to the memory. Memory may be integral to a processor and still be said to be in electronic communication with the processor.

As used herein, the terms "code" and "instructions" should be interpreted broadly to include any type of computer-readable statement(s). For example, the terms "code" and "instructions" may refer to one or more programs, routines, sub-routines, functions, procedures, etc. "Code" and "instructions" may comprise a single computer-readable statement or many computer-readable statements.

As used herein, the term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device, such as a mobile station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communications device that is configured to detect double talk, comprising:
an echo canceller configured to cancel an echo from an input signal; and
a double-talk detector that provides a double-talk statistic that is based on a result of a comparison between a power of a cancellation error signal based on the input signal, and a cross-correlation between the cancellation error signal and the input signal.

2. The communications device of claim 1, wherein the echo canceller comprises an adaptive filter, and wherein the device is configured to stop the adaptive filter from adapting when the double-talk detector detects a near-end signal.

3. The communications device of claim 2, wherein the device is further configured to resume adapting by the adaptive filter when the double-talk detector does not detect a near-end signal.

4. The communications device of claim 1, wherein the remaining echo energy in the cancellation error signal is the residual echo energy in the input signal after the input signal has been processed by an adaptive filter.

5. The communications device of claim 1, wherein the double-talk statistic is computed using second order statistics of available signals.

6. The communications device of claim 5, wherein the double-talk statistic is computed based on the following equation:

$$\hat{\xi}_{New}[n] = \frac{\hat{r}_{em}[n] - \hat{\sigma}_e^2[n]}{\hat{r}_{em}[n]}$$

wherein $\hat{\xi}_{New}[n]$ is the double-talk statistic, wherein $\hat{r}_{em}[n]$ is the cross-correlation between the cancellation error and a microphone input signal, and wherein $\hat{\sigma}_e^2[n]$ is the estimated variance or the power of the cancellation error signal e[n].

7. The communications device of claim 1, wherein the double-talk statistic is computed in the frequency domain using the following equation:

$$\hat{\xi}_{New}(k, t) = \frac{\hat{r}_{em}(k, t) - \hat{\sigma}_e^2(k, t) + \alpha \hat{\sigma}_x^2(k, t)}{\hat{r}_{em}(k, t)}$$

wherein $\alpha$ is a positive quantity, wherein $\hat{\xi}_{New}(k, t)$ is the double-talk statistic for the $k^{th}$ bin and $t^{th}$ time frame, wherein $\hat{r}_{em}(k, t)$ is the cross-correlation between the cancellation error and a microphone input signal, wherein $\hat{\sigma}_e^2(k, t)$ is the estimated variance or the power of the cancellation error signal $e(k, t)$ and $\hat{\sigma}_x^2(k, t)$ is the estimated variance or the power of a far-end excitation signal $x(k, t)$.

8. The communications device of claim 1, further comprising a non-linear post processing component configured to remove residual echo, wherein the non-linear post processing component processes based on the double-talk statistic.

9. The communications device of claim 1, wherein a correction factor is added to the numerator in the equation for background noise protection as shown below:

$$\hat{\xi}_{New}[n] = \frac{\hat{r}_{em}[n] - \hat{\sigma}_e^2[n] + \alpha \hat{\sigma}_x^2[n]}{\hat{r}_{em}[n]}$$

wherein $\alpha$ is a positive quantity, wherein $\hat{\xi}_{New}[n]$ is the double-talk statistic, wherein $\hat{r}_{em}[n]$ is the cross-correlation between the cancellation error and a microphone input signal, wherein $\hat{\sigma}_e^2[n]$ is the estimated variance or the power of the cancellation error signal e[n] and wherein $\hat{\sigma}_x^2[n]$ is the variance or the power of a far-end excitation signal x[n].

10. The communications device of claim 1, wherein the echo canceller comprises an acoustic echo canceller.

11. The communication device of claim 1, wherein an echo canceller configured to cancel an echo from the input signal uses an adaptive filter.

12. The communication device of claim 1, wherein the double-talk statistic is proportional to the ratio of the remaining echo energy in the cancellation error signal and the total cancellation error energy.

13. A method for double-talk detection in a communications device, the method comprising:
receiving an input signal at a microphone input;
cancelling an echo from the input signal;
determining a double-talk statistic that is based on the result of a comparison between
a power of a cancellation error signal from the input signal, and
a cross-correlation between the cancellation error signal and the input signal; and
using the double-talk statistic to control echo cancellation.

14. The method of claim 13, further comprising using the double-talk statistic to control adaptation of an adaptive filter by stopping the adaptive filter from adapting when the double-talk detector detects a near-end signal.

15. The method of claim 14, wherein using the double-talk statistic to control adaptation of the adaptive filter further comprises resuming adapting by the adaptive filter when the double-talk detector does not detect a near-end signal.

16. The method of claim 13, wherein the remaining echo energy in the cancellation error signal is the residual echo energy in the input signal after the input signal has been processed by an adaptive filter.

17. The method of claim 13, wherein the double-talk statistic is computed using second order statistics of available signals.

18. The method of claim 17, wherein the double-talk statistic is computed based on the following equation:

$$\hat{\xi}_{New}[n] = \frac{\hat{r}_{em}[n] - \hat{\sigma}_e^2[n]}{\hat{r}_{em}[n]}$$

wherein $\hat{\xi}_{New}[n]$ is the double-talk statistic, wherein $\hat{r}_{em}[n]$ is the cross-correlation between the cancellation error and a microphone input signal, and wherein $\hat{\sigma}_e^2[n]$ is the variance or the power of the cancellation error signal $e[n]$.

19. The method of claim 18, wherein the double-talk statistic is computed in the frequency domain.

20. The method of claim 18, further comprising performing non-linear post processing based on the double-talk statistic to remove residual echo.

21. The method of claim 18, wherein a correction factor is added to the numerator in the equation for background noise protection.

22. The method of claim 13, wherein cancelling an echo from the input signal is achieved using an adaptive filter.

23. The method of claim 13, wherein the double-talk statistic is proportional to the ratio of the remaining echo energy in the cancellation error signal and the total cancellation error energy.

24. A communications device that is configured to detect double talk, comprising:

means for receiving an input signal;
means for cancelling an echo from the input signal; and
means for determining a double-talk statistic that is based on the result of a comparison between
    a power of a cancellation error signal from the input signal, and
    a cross-correlation between the cancellation error signal and the input signal.

25. The communications device of claim 24, further comprising means for controlling adaptation of an adaptive filter.

26. The communications device of claim 24, wherein the remaining echo energy in the cancellation error signal is the residual echo energy in the input signal after the input signal has been processed by an adaptive filter.

27. The communications device of claim 24, wherein the double-talk statistic is computed using second order statistics of available signals.

28. The communications device of claim 27, wherein the double-talk statistic is computed based on the following equation:

$$\hat{\xi}_{New}[n] = \frac{\hat{r}_{em}[n] - \hat{\sigma}_e^2[n]}{\hat{r}_{em}[n]}$$

wherein $\hat{\xi}_{New}[n]$ is the double-talk statistic, wherein $\hat{r}_{em}[n]$ is the cross-correlation between the cancellation error signal and a microphone input signal, and wherein $\hat{\sigma}_e^2[n]$ is the estimated variance of the cancellation error signal $_{e[n]}$.

29. The communication device of claim 24, wherein cancellations of echo from the input signal is achieved using an adaptive filter.

30. The communication device of claim 24, wherein the double-talk statistic is proportional to the ratio of the remaining echo energy in the cancellation error signal and the total cancellation error energy.

31. A computer-program product for performing double-talk detection, the computer-program product comprising a non-transitory computer-readable medium having instructions thereon, the instructions comprising:
    code for receiving an input signal at a microphone input;
    code for cancelling an echo from the input signal using an adaptive filter;
    code for determining a double-talk statistic that is proportional to the result of a comparison between
        a power of a cancellation error signal based on the input signal, and
        a cross-correlation between the cancellation error signal and the input signal; and
    code for using the double-talk statistic to control adaptation of the adaptive filter.

* * * * *